Aug. 31, 1937.  F. ACCARDI  2,091,747
PACKING FOR VEHICLE DOORS
Filed July 26, 1935
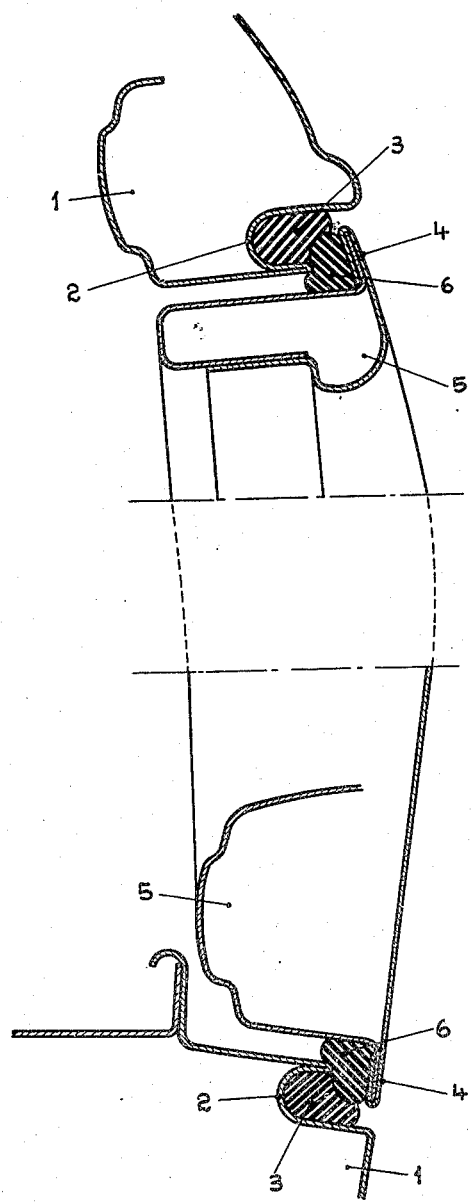

Patented Aug. 31, 1937

2,091,747

UNITED STATES PATENT OFFICE 2,091,747

PACKING FOR VEHICLE DOORS

Ferruccio Accardi, Turin, Italy, assignor to Fiat Societa Anonima, Turin, Italy

Application July 26, 1935, Serial No. 33,403
In Italy February 20, 1935

2 Claims. (Cl. 296—44)

This invention relates to a draught and weather excluding device for doors of vehicle bodies, comprising between the rabbet of the door frame and the flanged edge of the door a resilient strip of rubber or the like which can extend around the whole contour of the door and is compressed when the door is closed.

It is an object of this invention to dispose said resilient strip in a manner that the stresses acting thereon on closure of the door are absorbed in a particularly favorable manner and do not cause any considerable wear. For this purpose the resilient strip is fitted in a U-shaped channel, the flanges of which extend in substantially perpendicular direction to the door plane.

It is further an object of this invention to eliminate any separate means for fixing said resilient strip, the above-mentioned U-shaped channel being pressed from the sheet metal which forms the door frame, that is the body of the vehicle.

The accompanying drawing shows by way of example a construction of the object of this invention. The figure is a cross section taken on the door and door frame of a saloon car.

The frame of the vehicle door is constituted in the example shown and according to my copending application Serial No. 33,402, filed July 26, 1935 by a curved sheet metal member 1, from which a U-shaped channel 2 is pressed out, said channel having substantially horizontal flanges and extending around the whole contour of the door opening. A rubber cord 3 is inserted and projects slightly to the outside. A further rubber cord 6 is provided on the inside of the rabbet 4 of the door 5. On closing the door both rubber cords 3, 6 are pressed together over the whole contour of the door frame.

The contour of the door is free from sharp angles and is rounded at the corners to insure a better fit of the rubber cords and the contacting edges of the two rubber cords are rounded to fit.

The rubber cord can be fitted into the door by forming in the latter a groove corresponding to the groove 2, from which the rubber cord 6 projects slightly.

The rubber cord 6 can occasionally be omitted.
What I claim is:

1. Weather and draft excluding apparatus for motor vehicle bodies having door frames and doors, comprising a flange on the edge of the door lying approximately in the plane of the door, the frame being provided with a marginal rabbet having plane walls forming a relatively deep U-shaped channel, said walls extending in a substantially perpendicular direction to the door plane, and a resilient strip extending over the whole periphery of the door frame and fitted in said U-shaped channel, said strip being also relatively deep and adapted to be held in said channel by frictional engagement with said walls thereof, said strip extending slightly beyond one wall of said channel so as to be pressed between said flanged edge of the door and said rabbet of the frame when the door is closed, whereby when the door is closed the flange elastically compresses the sealing strip throughout its full depth, and the sides of said strip are free to move relatively to said walls of the channel except for frictional grip.

2. Weather and draft excluding apparatus for motor vehicle bodies of sheet metal having door frames and doors, comprising a flange on the edge of the door lying approximately in the plane of the door, the frame being formed from the body metal sheet and provided with a marginal rabbet, the body and frame forming metal sheet having plane walls pressed out therefrom at the rabbet and forming a relatively deep U-shaped channel, said walls extending in a substantially perpendicular direction to the door plane, and a resilient strip extending over the whole periphery of the door frame and fitted in said U-shaped channel, said strip being also relatively deep and adapted to be held in said channel by frictional engagement with the walls thereof, said strip extending slightly beyond one wall of said channel so as to be pressed between said flanged edge of the door and said rabbet of the frame when the door is closed, whereby when the door is closed the flange elastically compresses the sealing strip throughout its full depth, and the sides of said strip are free to move relatively to said walls of the channel except for frictional grip.

FERRUCCIO ACCARDI.